(12) United States Patent
Washiro

(10) Patent No.: US 8,185,047 B2
(45) Date of Patent: May 22, 2012

(54) NEAR FIELD COMMUNICATION APPARATUS FOR AUTOMATED ASSIGNING OF VARIOUS FUNCTIONS

(75) Inventor: Takanori Washiro, Kanagawa (JP)

(73) Assignee: Sony Corporation, Tokyo (JP)

( * ) Notice: Subject to any disclaimer, the term of this patent is extended or adjusted under 35 U.S.C. 154(b) by 516 days.

(21) Appl. No.: 12/423,132

(22) Filed: Apr. 14, 2009

(65) Prior Publication Data

US 2009/0264068 A1   Oct. 22, 2009

(30) Foreign Application Priority Data

Apr. 17, 2008   (JP) ................. P2008-108137

(51) Int. Cl.
*H04B 5/00* (2006.01)
(52) U.S. Cl. ..................................... 455/41.1
(58) Field of Classification Search ............... 455/41.1, 455/41.2, 41.3
See application file for complete search history.

(56) References Cited

U.S. PATENT DOCUMENTS

| | | | | |
|---|---|---|---|---|
| 7,403,744 B2* | 7/2008 | Bridgelall | ................ | 455/41.2 |
| 7,541,930 B2* | 6/2009 | Saarisalo et al. | ........... | 340/572.7 |
| 7,595,732 B2* | 9/2009 | Shameli et al. | ........... | 340/572.5 |
| 7,872,581 B2* | 1/2011 | Darianian et al. | ......... | 340/572.1 |
| 2007/0008140 A1* | 1/2007 | Saarisalo et al. | ........... | 340/572.7 |
| 2009/0009295 A1* | 1/2009 | Rofougaran | ................. | 340/10.1 |
| 2009/0072843 A1* | 3/2009 | Slupsky et al. | ............... | 324/750 |
| 2011/0156872 A1* | 6/2011 | Wengrovitz | ................ | 340/10.1 |

FOREIGN PATENT DOCUMENTS

| | | |
|---|---|---|
| EP | 1 898 530 A2 | 3/2008 |
| JP | 10-105803 | 4/1998 |
| JP | 210-198847 | 7/1998 |
| JP | 11-6398 | 1/1999 |
| JP | 11-66398 | 3/1999 |
| JP | 2001-23007 | 1/2001 |
| JP | 2004-40209 | 2/2004 |
| JP | 2004-140729 | 5/2004 |
| JP | 2006-13693 | 1/2006 |
| JP | 2006-60283 | 3/2006 |
| JP | 2007-4490 | 1/2007 |

* cited by examiner

*Primary Examiner* — Lincoln Donovan
*Assistant Examiner* — William Hernandez
(74) *Attorney, Agent, or Firm* — Finnegan, Henderson, Farabow, Garrett & Dunner, L.L.P.

(57) ABSTRACT

There is provided a communication apparatus including a plurality of communication units for making communication through electric field coupling or magnetic field coupling, a detecting unit for detecting an approach between a communication party capable of communication through electric field coupling or magnetic field coupling and any one of the plurality of communication units, and a controlling unit for causing a communication unit whose approach to the communication party is detected by the detecting unit to serve a function of communication assigned to the communication unit, different functions of communication being assigned to each of the plurality of communication units.

9 Claims, 8 Drawing Sheets

NEAR FIELD COMMUNICATION APPARATUS FOR AUTOMATED ASSIGNING OF VARIOUS FUNCTIONS

BACKGROUND OF THE INVENTION

1. Field of the Invention

The present invention relates to a communication apparatus, a communication method, a program and a communication system.

2. Description of the Related Art

In recent years, there has been broadly used a radio wave communication system prescribed in the IEEE (Institute of Electrical and Electronic Engineers) 802.11. The radio wave communication system is configured such that an antenna is used to transmit and receive a wireless radio wave, but the wireless radio wave interferes with a radio wave transmitted or received therearound, which may affect the communication.

There is proposed a communication system which uses electric field coupling or magnetic field coupling to make communication other than the radio wave communication system. In the communication system, for example, when a plurality of coupler for performing magnetic field coupling approach, the couplers magnetically couple so that a communication is realized between the couplers through magnetic field coupling. In this manner, according to the communication system utilizing electric field coupling or magnetic field coupling, since a signal is not transmitted if a communication party does not approach, an issue for the interference is difficult to occur, which is more advantageous than the radio wave communication system. A technique for making communication through magnetic field coupling is described in Japanese Patent Application Laid-Open No. 2006-60283 Publication, for example.

In the communication system utilizing electric field coupling or magnetic field coupling, a plurality of functions such as reception function and transmission function may be mounted on one communication apparatus. In this case, the communication apparatus may be both transmission side and reception side for content data.

SUMMARY OF THE INVENTION

However, when a plurality of functions are simply mounted on one communication apparatus, after a plurality of communication apparatuses approach to each other, a user has to input a function to be served by the communication apparatuses, which is troublesome for the user.

The present invention has been made in views of the above issue, and it is desirable to provide a novel and improved communication apparatus, communication method, program and communication system capable of easily instructing functions of a communication to be served by the communication apparatus.

According to an embodiment of the present invention, there is provided a communication apparatus including a plurality of communication units for making communication through electric field coupling or magnetic field coupling, a detecting unit for detecting an approach between a communication party capable of communication through electric field coupling or magnetic field coupling and any one of the plurality of communication units, and a controlling unit for causing a communication unit whose approach to the communication party is detected by the detecting unit to serve a function of communication assigned to the communication unit, different functions of communication being assigned to each of the communication units.

The communication apparatus may include a signal processing unit for decoding a reception signal and a connecting unit for connecting any one of the plurality of communication units to the signal processing unit, the controlling unit may cause the connecting unit to sequentially switch a communication unit to be connected to the signal processing unit, and the detecting unit may detect a communication unit connected to the signal processing unit via the connecting unit when a reception signal is input into the signal processing unit.

A communication of different content data is assigned to each of the plurality of communication units, and the controlling unit may cause the signal processing unit to generate a transmission signal related to content data assigned to a communication unit whose approach to the communication party is detected by the detecting unit.

A data transmission processing or reception processing is assigned to each of the plurality of communication units, and the controlling unit may cause the signal processing unit, to perform a processing assigned to a communication unit whose approach to the communication party is detected by the detecting unit.

A communication related to a predetermined content, data group or a communication related to part of the content data group is assigned to each of the plurality of communication units, and the controlling unit may cause the signal processing unit to generate a transmission signal related to the content data group or part of the content data group assigned to a communication unit whose approach to the communication party is detected by the detecting unit.

The communication apparatus may further include a displaying unit for displaying a function of communication assigned to each of the plurality of communication units.

According to another embodiment of the present invention, there is provided a communication method including the steps of: detecting an approach between any one of a plurality of communication units for making communication through electric field coupling or magnetic field coupling and a communication party capable of communication through electric field coupling or magnetic field coupling, and causing a communication unit whose approach to the communication party is detected by the detecting unit to serve a function of communication assigned to the communication unit, different functions of communication being assigned to each of the plurality of communication units.

According to another embodiment of the present invention, there is provided a program for causing a computer to function as a detecting unit for detecting an approach between any one of a plurality of communication units for making communication through electric field coupling or magnetic field coupling and a communication party capable of communication through electric field coupling or magnetic field coupling, and a controlling unit for causing a communication unit whose approach to the communication party is detected by the detecting unit to serve a function of communication assigned to the communication unit, different functions of communication being assigned to each of the plurality of communication units.

According to another embodiment of the present invention, there is provided a communication system including a first communication apparatus having a first communication unit for making communication through electric field coupling or magnetic field coupling, and a second communication apparatus having a plurality of second communication units for making communication through electric field coupling or magnetic field coupling, a detecting unit for detecting an approach between the first communication unit and any one of the plurality of communication units, and a controlling unit for causing a communication unit whose approach to the first communication unit is detected by the detecting unit to serve a function of communication assigned to the communication unit, different functions of communication being assigned to each of the plurality of communication units.

According to the embodiments of the present invention described above, the functions of the communication to be served by the communication apparatus can be easily instructed.

DETAILED DESCRIPTION OF THE PREFERRED EMBODIMENTS

Figure 1:
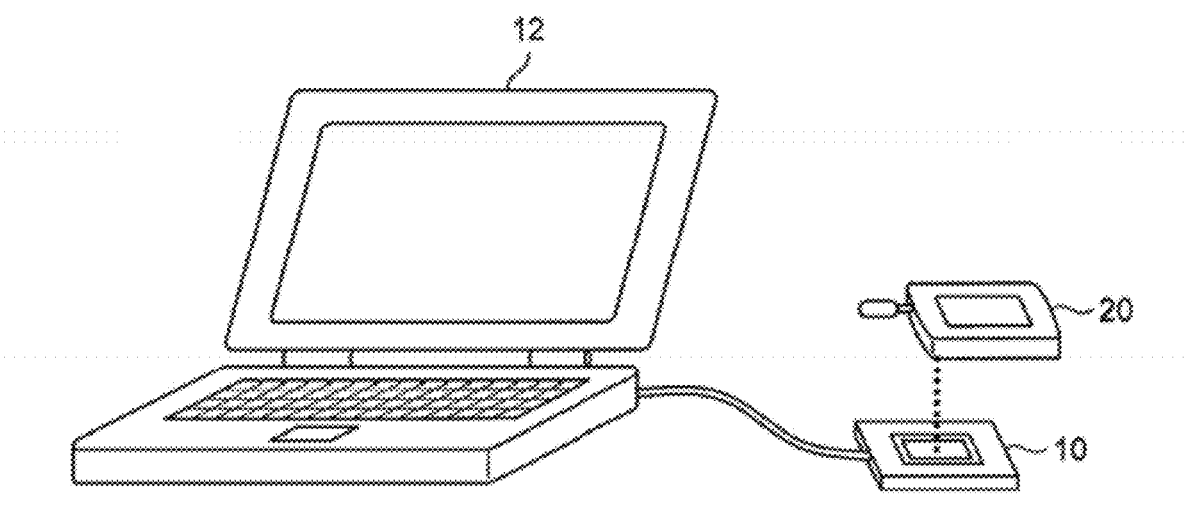
FIG. 1 is an explanatory diagram showing a communication system according to one embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

The "Best Mode for Carrying out the Invention" will be described according to the following items;

[1] Outline of the present embodiment
[2] How the present embodiment is made
[3] Detailed description of responder according to the present embodiment
[4] Detailed description of initiator according to the present embodiment
[5] Supplement

[1] Outline of the Present Embodiment

At first, an outline of a communication system according to one embodiment of the present invention will be described with reference to FIGS. 1 and 2.

FIG. 1 is an explanatory diagram showing a communication system according to one embodiment of the present invention. As shown in FIG. 1, the communication system according to the present embodiment includes a pair of devices (communication apparatuses) having a communication device 10 and a portable device 20, and an information processing device 12. Further, the communication device 10 and the portable device 20 include an electrode plate which is referred to as electric field coupler capable of electric field coupling with each other. When both electric field couplers of the communication device 10 and the portable device 20 approach within 3 cm, for example, a change in inductive electric field occurring by one electric field coupler is sensed by the other electric field coupler so that, electric field communication is realized between the communication device 10 and the portable device 20.

Specifically, in a pair of devices for making the above electric field communication, one of the pair functions as an initiator and the other functions as a responder. The initiator is directed for making a connection establishment request and the responder is directed for receiving the connection establishment request from the initiator.

For example, when the portable device 20 shown in FIG. 1 functions as an initiator and the communication device 10 functions as a responder, if the portable device 20 and the communication device 10 approach each other, the communication device 10 receives a connection establishment request transmitted from the portable device 20. Then, when the communication establishment request is received by the communication device 10, the communication device 10 and the portable device 20 perform authentication processing, and if the authentication processing is normally ended, the communication device 10 and the portable device 20 are connected to a state where data communication is possible. The authentication processing includes, for example, confirmation as to whether software versions or emulation systems indicating protocol are coincided between the communication device 10 and the portable device 20.

Thereafter, the communication device 10 and the portable device 20 make data communication in one-to-one. More specifically, the portable device 20 transmits arbitrary data to the communication device 10 by an electric field coupler, and the communication device 10 outputs the data received from the portable device 20 to the information processing device 12. Alternatively, arbitrary data is input from the information processing device 12 into the communication device 10, and the communication device 10 transmits the data input from the information processing device 12 to the portable device 20 by the electric field coupler. The arbitrary data includes music data such as music, lecture or radio program, video data such as cinema, TV program, video program, photographs, documents, pictures and graphics, or games and software.

Since a radio wave emitted from an antenna attenuates in reverse proportion to the square of the distance and the intensity of the inductive electric field occurring from the electric field coupler is reversely proportional to the fourth power of the distance, the distance between a pair of devices capable of electric field communication can be advantageously restricted. In other words, there can be obtained effects that deterioration in a signal due to surrounding obstacle is less in the electric field communication and a technique for preventing hacking or securing confidential can be simplified.

A radio wave emitted from an antenna has a transverse wave component oscillating in a direction orthogonal to the wave traveling direction and a polarized wave is present therein. To the contrary, since the electric field coupler generates an inductive electric field having a longitudinal wave component oscillating in the traveling direction and having no polarized wave, if the faces of the pair of electric field couplers are opposed to each other, a signal can be conveniently received at the reception side.

In the present specification, there will be described an example in which a pair of communication apparatuses utilizes an electric field coupler to make a short distance wireless communication (non-contact communication, TransferJet), but the present invention is not limited to the example. For example, a pair of communication apparatuses can also make short distance wireless communication via a communication unit capable of communication through magnetic field coupling.

Further, the communication device 10 and the portable device 20 are merely shown as one example of the communication apparatus in FIG. 1, and the present invention is not limited to the example. For example, the communication apparatus may be an information processing device such as PC (personal computer), home video processing device (such as DVD recorder or video cassette recorder), cell phone, PHS (personal handyphone system), portable music player, portable video processing device, PDA (personal digital assistants), home game device, portable game device or household electrical appliance. Further, the communication apparatus may be a content server 30 for providing content data as shown in FIG. 2.

Figure 2:
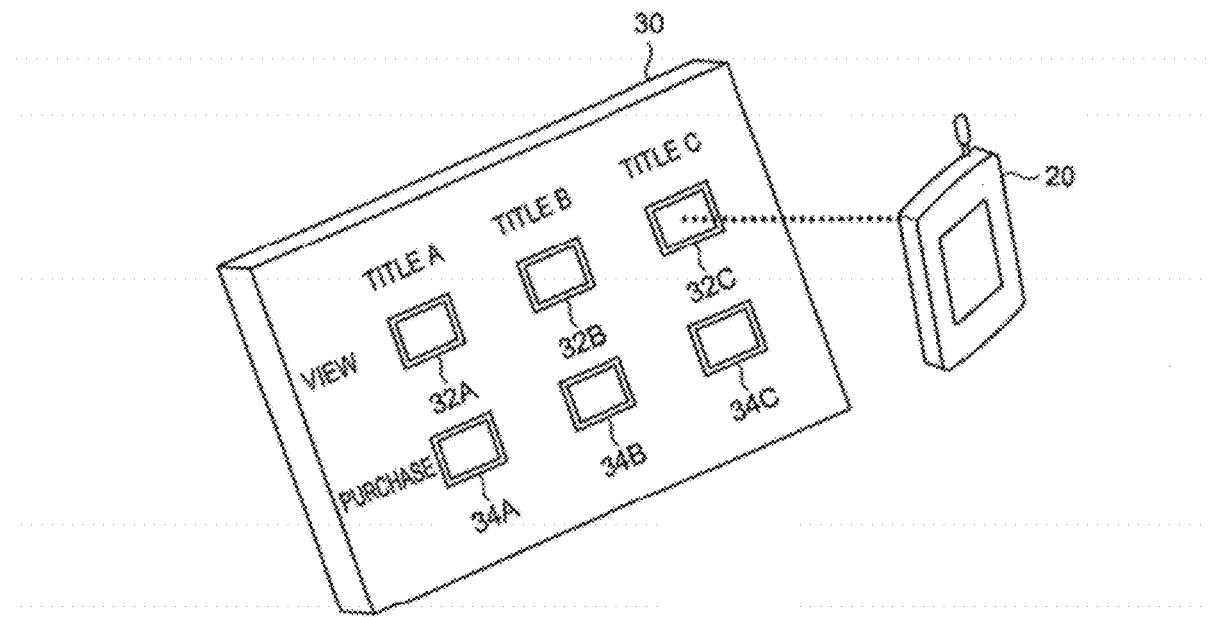
FIG. 2 is an explanatory diagram showing a variant of the communication system according to one embodiment of the present invention.

FIG. 2 is an explanatory diagram showing a variant of the communication system according to one embodiment of the present invention. As shown in FIG. 2, the communication system according to the variant includes the portable device 20 and the content server 30. The content server 30 stores content data therein or is connected to a content data storing device via a communication network, which provides services such as viewing and selling of the content data.

In the example shown in FIG. 2, the content server 30 includes view position displays 32A to 32C and purchase position displays 34A to 34C corresponding to the content data with title A to title C. A field coupled is provided inside each of the view position displays 32A to 32C and the purchase position displays 34A to 34C, and the content server 30 provides a service corresponding to the electric field coupler which the portable device 20 approaches.

For example, when the electric field coupler of the portable device 20 and the electric field coupler inside the view position display 32C approach each other, the content server 30 transmits the content data "title C" from the electric field coupler inside the view position display 32C to enable the portable device 20 to view it. Further, when the electric field coupler of the portable device 20 and the electric field coupler inside the purchase position display 34A approach each other, the content server 30 transmits the content data "title A" from the electric field coupler inside the purchase position display 34A and performs accounting.

[2] How the Present Embodiment is Made

As described above, a communication apparatus for making electric field communication may be provided with a plurality of electric field couplers and a different function may be assigned to each electric field coupler. However, if a transmission circuit and a reception circuit are separately provided in each of the plurality of electric field couplers, the cost and the hardware scale increase.

Figure 3:
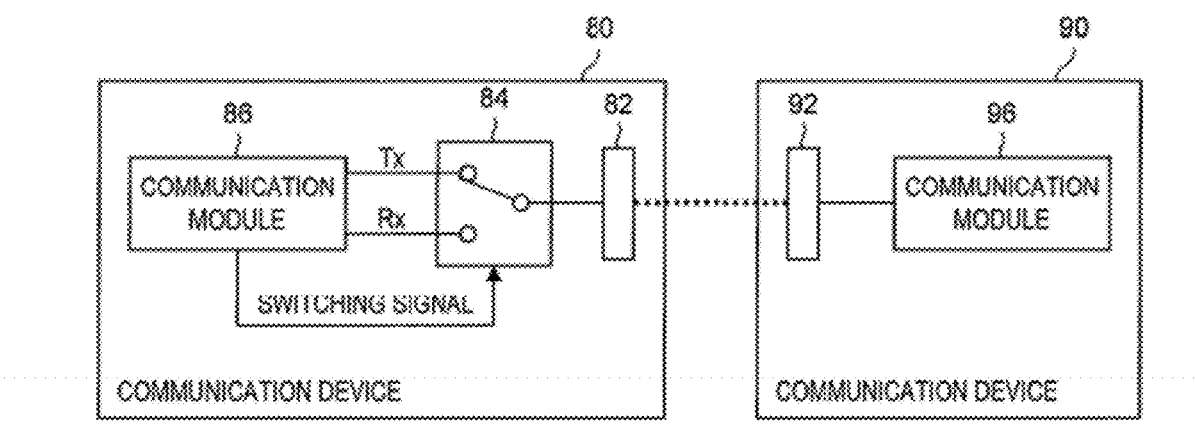
FIG. 3 is an explanatory diagram showing a structure of a communication apparatus in association with the present embodiment.

Furthermore, structures of a communication apparatus 80 and a communication apparatus 90 in association with the present embodiment will be shown in FIG. 3 as a comparative example. As shown in FIG. 3, the communication apparatus 80 in association with the present embodiment includes an electric field coupler 82, a selector 84 and a communication module 86, and the communication apparatus 90 includes an electric field coupler 92 and a communication module 96.

The communication apparatus 80 in association with the present embodiment can perform data transmission when a transmission circuit included in the communication module 86 is connected to the electric field coupler 82 via the selector 84. On the other hand, the communication apparatus 80 in association with the present embodiment can perform data reception when a reception circuit is connected to the electric field coupler 82 via the selector 84.

However, in the communication apparatus 80 in association with the present embodiment, a user needs to instruct the communication apparatus 80 to perform either data transmission or data reception through button inputting after the user makes the electric field couplers 82 and 92 approach, and thus improvement in convenience is desired.

Therefore, the present embodiment has been made in terms of the above circumstances. According to the present embodiment, the structures of the initiator and the responder can be simplified. Further, according to the present embodiment, the function of the communication to be served by the initiator or the responder can be simply instructed. Hereinafter, the initiator and the responder according to the present embodiment will be described in detail.

[3] Detailed Description of Responder According to the Present Embodiment

Figure 4:
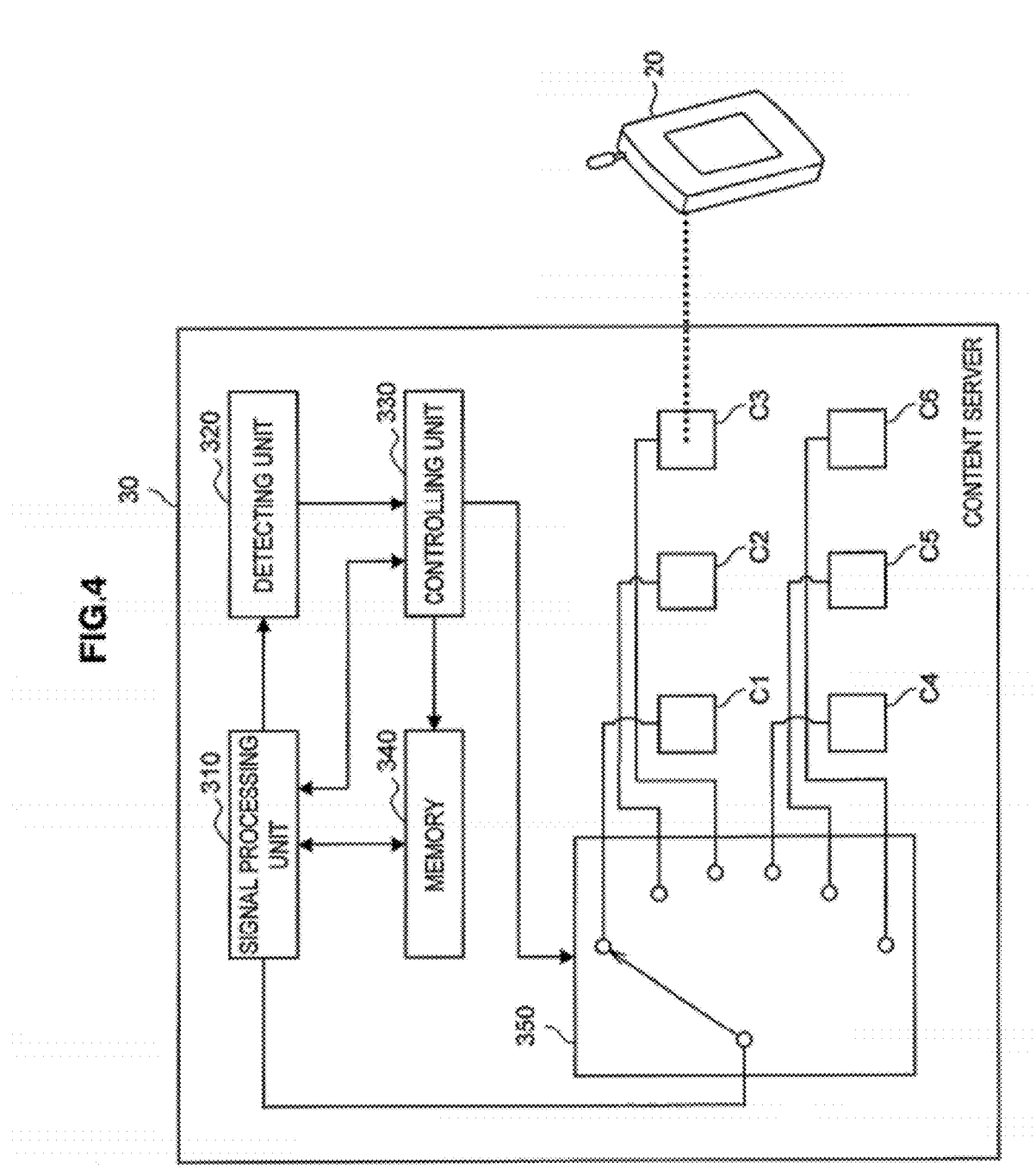
FIG. 4 is a functional block diagram showing a structure of a content server functioning as a responder.

FIG. 4 is a functional block diagram showing a structure of the content server 30 functioning as a responder. As shown in FIG. 4, the content server 30 includes a signal processing unit 310, a detecting unit 320, a controlling unit 330, a memory 340, a selector (connecting unit) 350 and a plurality of electric field couplers C1 to C6.

The electric field couplers C1 to C6 function as a communication unit which makes communication with the electric field coupler of the neighboring portable device 20 through electric field coupling as described in "[1] Outline of the present embodiment". In the present, embodiment, the electric field couplers C1 to C6 are selectively connected to the signal processing unit 310 via the selector 350. Different numbers are denoted after the alphabet "C" in order to discriminate each electric field coupler in the above description, but the electric field couplers are collectively referred to as electric field coupler C if each electric field coupler does not need to be specifically discriminated.

The signal processing unit 310 generates a transmission signal and decodes a reception signal. Specifically, the signal processing unit 310 decodes a reception signal received by any one electric field coupler C connected via the selector 350. Alternatively, the signal processing unit 310 generates a transmission signal to be transmitted from any one electric field coupler C connected via the selector 350.

The controlling unit 330 controls the entire operation of the content server 30. For example, the controlling unit 330 outputs a switching signal to the selector 350 while waiting for a connection establishment request from the portable device 20 as an initiator, and causes the selector 350 to periodically switch the electric field coupler C to be connected to the signal processing unit 310. On the other hand, after the connection establishment request from the portable device 20 as an initiator is received by a certain electric field coupler C, the controlling unit 330 continuously connects the electric field coupler C and the signal processing unit 310.

The detecting unit 320 detects an approach between the electric field coupler of the portable device 20 as an initiator and airy one of the electric field couplers C1 to C6. The detecting unit 320 can detect which electric field coupler C has approached the electric field coupler of the portable device 20 based on the timing at which the reception signal is input into the signal processing unit 310. Hereinafter, a specific example of the approach detection by the detecting unit 320 will be described with reference to FIG. 5.

Figure 5:
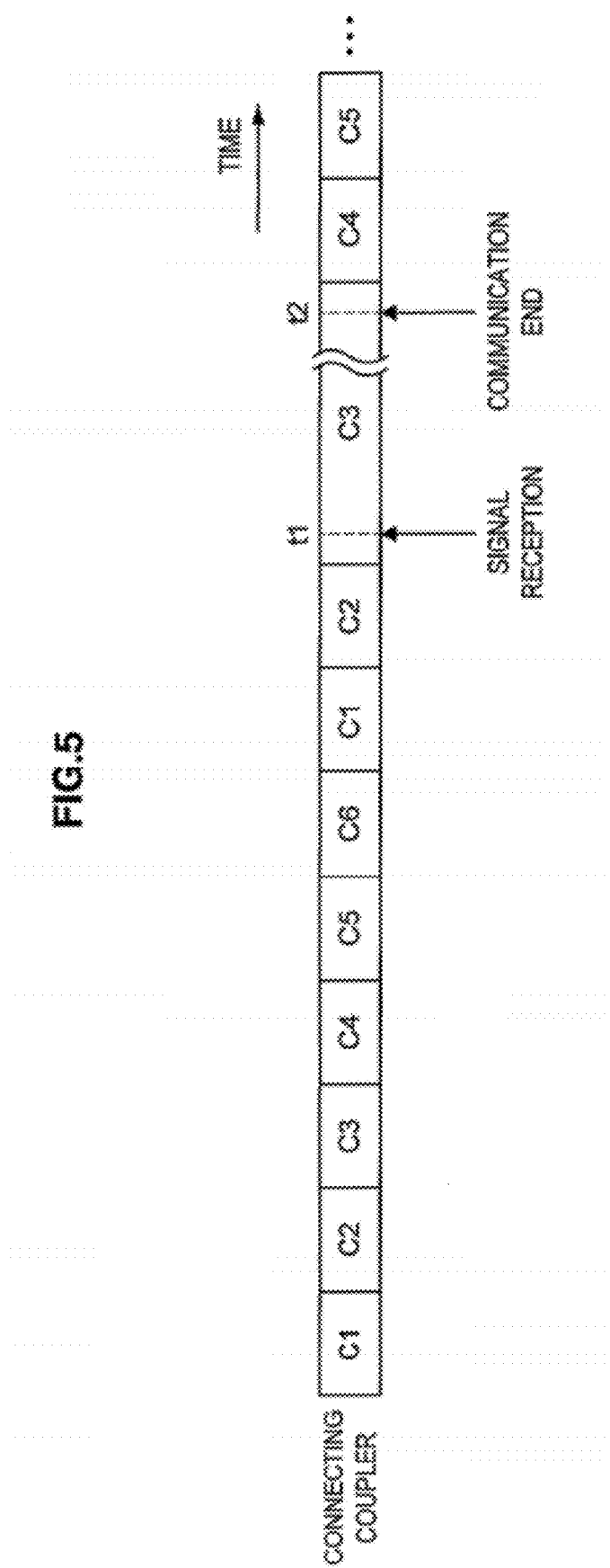
FIG. 5 is an explanatory diagram showing how an electric field coupler C connected to a signal processing unit is switched.

FIG. 5 is an explanatory diagram showing how the electric field coupler C to be connected to the signal processing unit 310 is switched. As shown in FIG. 5, the selector 350 periodically swatches the electric field coupler C to be connected to the signal processing unit 310 while waiting for the connection establishment request from the portable device 20 as an initiator based on the switching signal from the controlling unit 330. For example, the selector 350 switches the connection destination of the signal processing unit 310 in the order of the electric field couplers C1, C2, C3, C4, C5, C6, C1 as shown in FIG. 5.

As shown in FIG. 5, when the connection establishment request is input into the signal processing unit 310 at timing t1, the detecting unit 320 detects an approach between the electric field coupler C3 connected to the signal processing unit 310 and the electric field coupler of the portable device 20 at timing t1. Then, the controlling unit 330 maintains the connection between the signal processing unit 310 and the electric field coupler C3 at least until timing t2 at which the communication between the electric field coupler C3 and the portable device 20 ends.

In the present embodiment, a different function is assigned to each of the electric field couplers C1 to C6. Specifically, the electric field couplers C1 to C3 are arranged inside the view position displays 32A to 32C shown in FIG. 2, and the electric field couplers C4 to C6 are arranged inside the purchase position displays 34A to 34C. In other words, a view service function of different content data is assigned to each of the electric field couplers C1 to C3 and a selling service function of different content data is assigned to each of the electric field couplers C4 to C6.

Thus, when the approach between the portable device 20 and the electric field coupler C3 is detected by the detecting unit 320, the controlling unit 330 supplies the content data with "title C" from the memory 340 to the signal processing unit 310. Then, the signal processing unit 310 generates the transmission signal of the content data with "title C" and the transmission signal of the content data with "title C" is transmitted from the electric field coupler C3 to the portable device 20.

The memory 340 is a storing medium into which arbitrary data to be transmitted from the electric field couplers C1 to C6 or data received by the electric field couplers C1 to C6 is recorded. For example, the memory 340 may be a storing medium including non-volatile memory such as EEPROM (Electrically Erasable Programmable Read-Only Memory) and EPROM (Erasable Programmable Read Only Memory), magnetic disk such as hard disk and disk-shaped magnetic disk, optical disk such as CD-R (Compact Disc Recordable)/RW (Rewritable), DVD-R (Digital Versatile Disc Recordable)/RW/+R/+RW/RAM (Random Access Memory) and BD (Blue-Ray Disc (registered trademark))–R/BD/RE, or MO (Magneto Optical) disk.

Then, when the electric field communication between the portable device 20 and the electric field coupler C3 ends at timing t2, the controlling unit 330 causes the selector 350 to periodically switch the connection destination of the signal processing unit 310 again.

Next, a flow of a series of operations by the content server 30 and the portable device 20 will be described with reference to FIG. 6.

Figure 6:
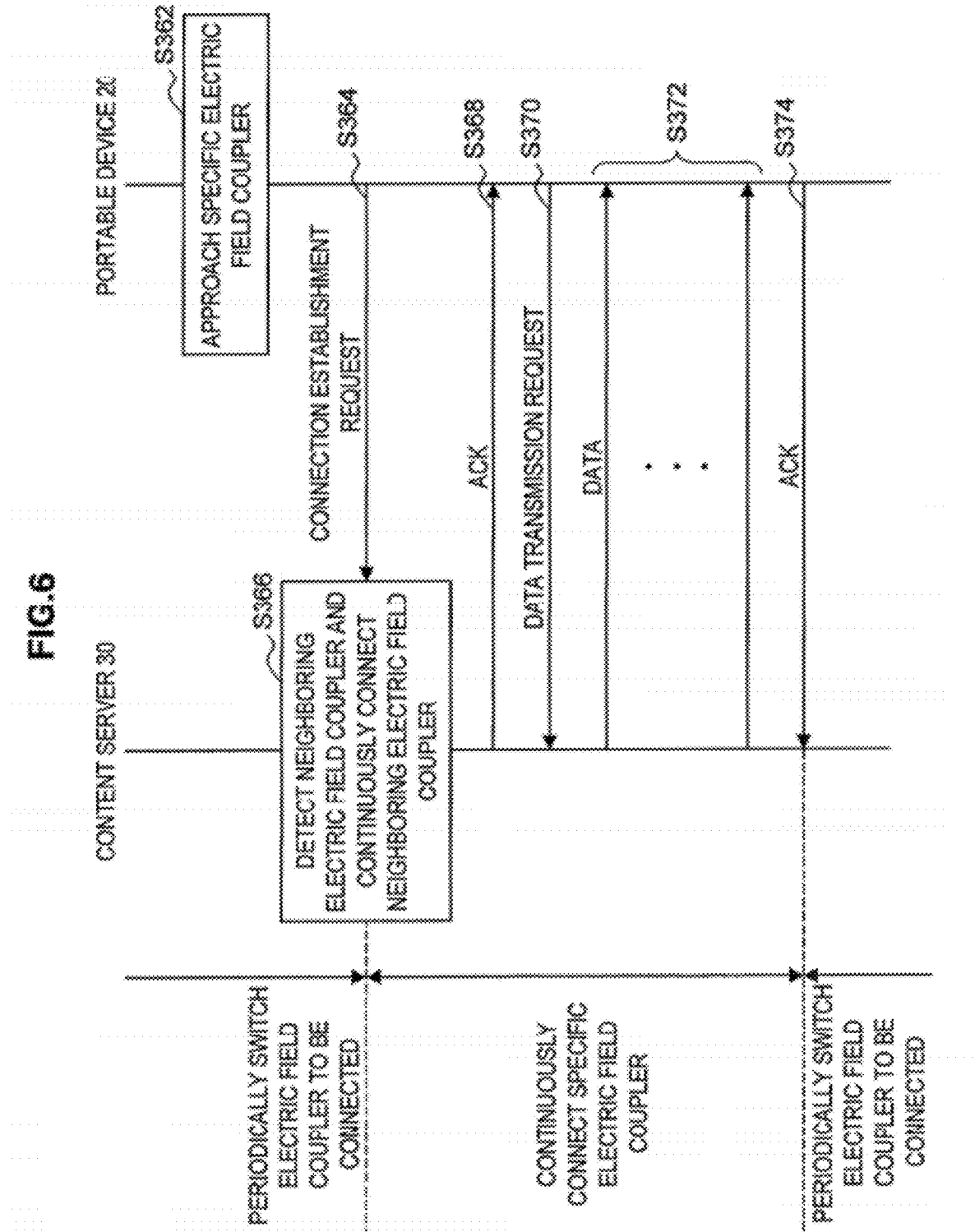
FIG. 6 is a sequence diagram showing a flow of a series of operations by the content server and a portable device.

FIG. 6 is a sequence diagram showing a flow of a series of operations by the content server 30 and the portable device 20. As shown in FIG. 6, in a state where the electric field coupler C connected to the signal processing unit 310 in the content server 30 is periodically switched by the selector 350, the portable device 20 is assumed to approach a certain electric field coupler C of the content server 30 (S362). In this case, a connection establishment request transmitted from the portable device 20 is received by the certain electric field coupler C of the content server 30 (S364).

Then, the detecting unit 320 in the content server 30 detects the certain electric field coupler C which has received the connection establishment request from the portable device 20, and subsequently the controlling unit 330 controls such that the certain electric field coupler C is continuously connected to the signal processing unit 310 (S336). Thereafter, when ACK generated by the signal processing unit 310 is transmitted from the certain electric field coupler C and the ACK is received by the portable device 20, the content server 30 and the portable device 20 are connected to the state where the data communication is permitted (S368).

Thereafter, when a data transmission request is transmitted from the portable device 20 to the certain electric field coupler C (S370), the controlling unit 330 causes the signal processing unit 310 to generate a transmission signal of the content data corresponding to the certain electric field coupler C. Then, the certain electric field coupler C transmits the transmission signal generated by the signal processing unit 310 to the portable device 20 (S372).

Further, when the transmission signal is normally received in the portable device 20 from the content server 30, ACK is transmitted from the portable device 20 (S374). When the ACK is received by the certain electric field coupler C, the controlling unit 330 determines that the communication with the portable device 20 ends, and causes the selector 350 to periodically switch the connection destination of the signal processing unit 310 again.

As described above, the content server 30 functioning as a responder according to the present embodiment includes a plurality of electric field couplers C1 to C6, and the controlling unit 330 periodically switches the electric field coupler C to be connected to the signal processing unit 310. Thus, the detecting unit 320 detects which of the electric field couplers C1 to C6 the portable device 20 has approached based on the timing at which the reception signal is input into the signal processing unit 310 and the controlling unit 330 causes the signal processing unit 310 to perform the signal processing corresponding to the detected electric field coupler C. Consequently, the content server 30 according to the present embodiment includes the plurality of electric field couplers C1 to C6 but can operate based on the one signal processing unit 310, thereby reducing the cost and resolving the issue for increased circuit scale.

[4] Detailed Description of Initiator According to the Present Embodiment

Next, the portable device 20 functioning as an initiator will be described with reference to FIGS. 7 to 9.

Figure 7:
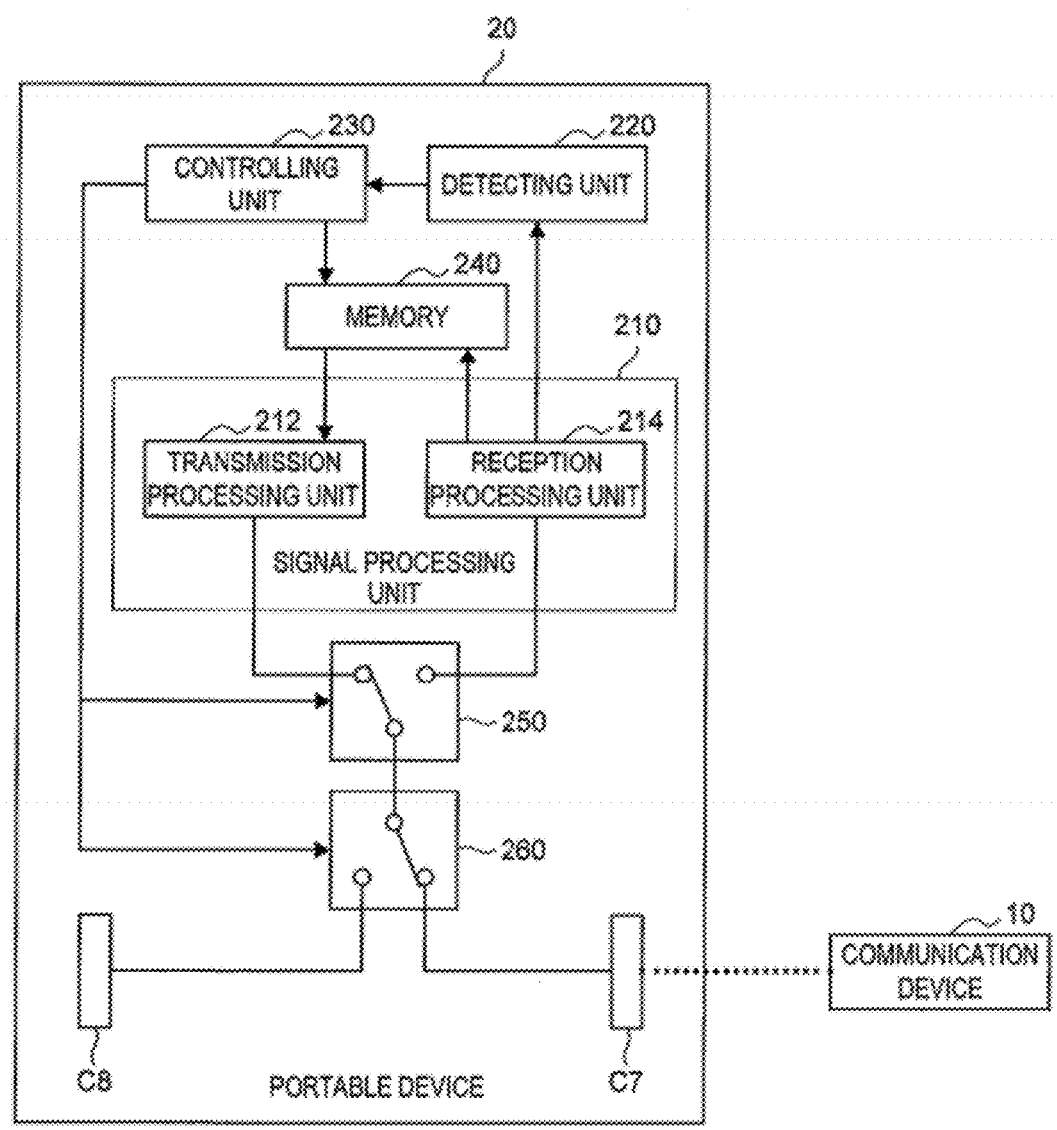
FIG. 7 is a functional block diagram showing a structure of the portable device functioning as an initiator.

FIG. 7 is a functional block diagram showing a structure of the portable device 20 functioning as an initiator. As shown in FIG. 7, the portable device 20 includes a plurality of electric field couplers C7 and C8, a signal processing unit 210, a detecting unit 220, a controlling unit 230, a memory 240 and selectors 250, 260.

The electric field couplers C7 and C8 function as a communication unit for communicating with the electric field coupler of the neighboring communication device 10 through electric field coupling. In the present embodiment, the electric field couplers C7 and C8 are selectively connected to the signal processing unit 210 via the selector 260. It is assumed that the electric field coupler C7 is provided on the opposite side to the electric field coupler C8 in the portable device 20, a reception function is assigned to the electric field coupler C7 and a transmission function is assigned to the electric field coupler C8.

The signal processing unit 210 includes a transmission processing unit 212 for generating a transmission signal and a reception processing unit 214 for decoding a reception signal. The electric field coupler C connected to the signal processing unit 210 is switched by the selector 260. Further, a connection between either the transmission processing unit 212 or the reception processing unit 214 in the signal processing unit 210 and the electric field coupler C is switched by the selector 250. In the example shown in FIG. 7, the electric field coupler C7 is connected to the signal processing unit 210 by the selector 260 and the transmission processing unit 212 of the signal processing unit 210 is connected to the electric field coupler C7 by the selector 250.

The controlling unit 230 controls the entire operation of the portable device 20. For example, the controlling unit 230 outputs a switching signal to the selector 250 and the selector 260 and periodically switches the connection by the selector 250 and the selector 260 before the connection establishment with the communication device 10 as a responder. On the other hand, when a response for the connection establishment request is made from the communication device 10 as a responder to one electric field coupler C, the controlling unit 230 causes the selector 260 to continuously connect the electric field coupler C and the signal processing unit 210.

The detecting unit 220 detects an approach between the electric field coupler of the communication device 10 as a responder and either the electric field coupler C7 or C8. The detecting unit 220 can detect which electric field coupler C the electric field coupler of the communication device 10 has approached based on the timing at which the reception signal is input into the signal processing unit 210. Hereinafter, a specific example of the approach detection by the detecting unit 220 will be described with reference to FIG. 8.

Figure 8:
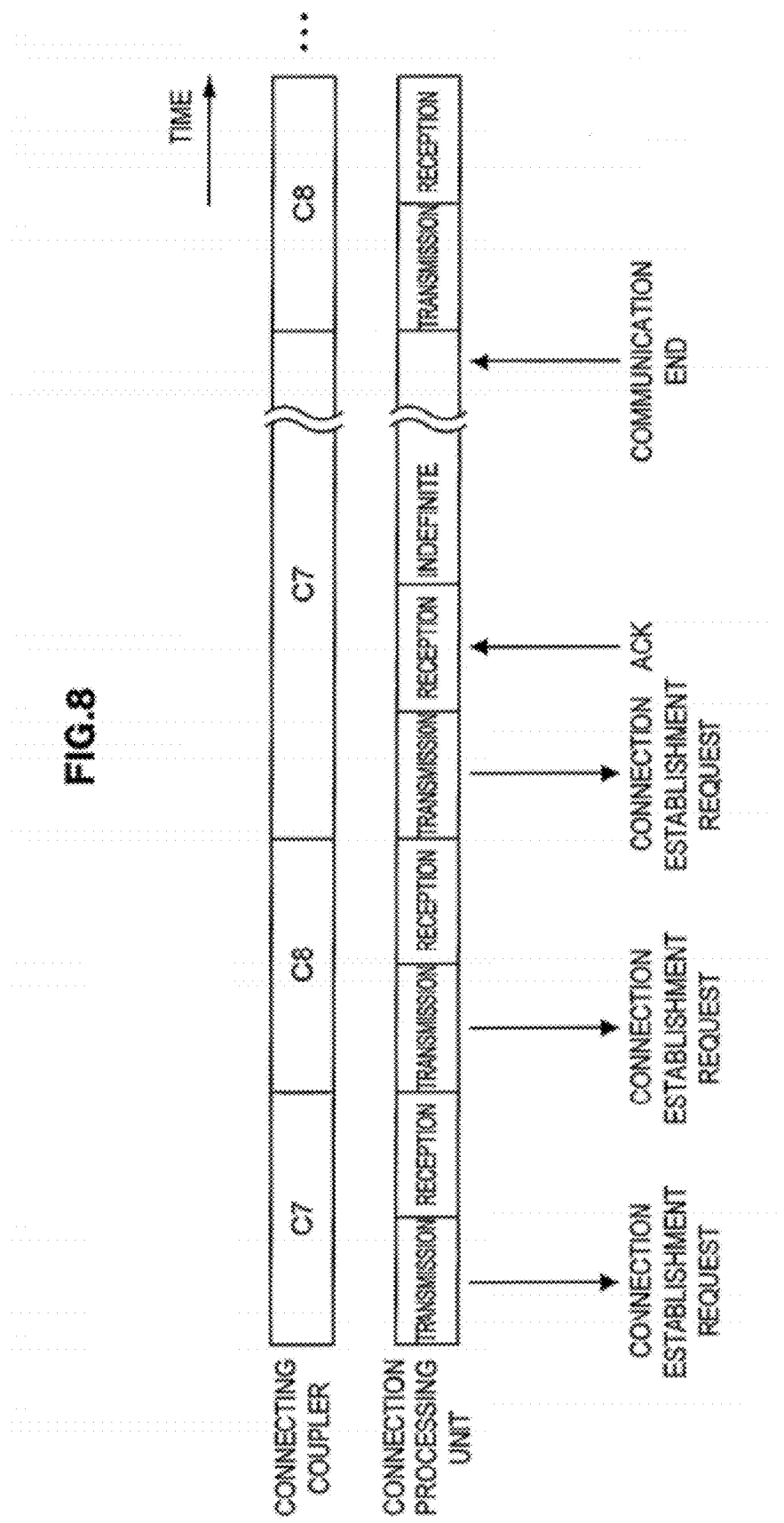
FIG. 8 is an explanatory diagram showing a connection relationship between the electric field coupler and the signal processing unit.

FIG. 8 is an explanatory diagram showing a connection relationship between the electric field coupler C and the signal processing unit 210. As shown in FIG. 8, the selector 260 periodically switches the electric field coupler C to be connected to the signal processing unit 210 based on the switching signal from the controlling unit 230 before a response for the connection establishment request is made from the communication device 10. Furthermore, the selector 250 switches the connection destination with the electric field coupler between the transmission processing unit 212 and the reception processing unit 214 while the connection with the same electric field coupler is maintained by the selector 260.

For example, as shown in FIG. 8, the selector 250 connects the electric field coupler C7 and the transmission processing unit 212, and then the electric field coupler C7 and the reception processing unit 214 while the electric field coupler C7 and the signal processing unit 210 are connected to each other by the selector 260. Here, the transmission processing unit 212 transmits a connection establishment request of requesting a connection to the responder while being connected to the electric field coupler C7. Then, when ACK transmitted from the communication device 10 as a responder is input into the reception processing unit 214 while the reception processing unit 214 is connected to the electric field coupler C7, the detecting unit 220 can detect that the electric field coupler C7 has approached the communication device 10.

When the approach between the electric field coupler C7 and the communication device 10 is detected by the detecting unit 220, the controlling unit 230 maintains the connection between the signal processing unit 210 and the electric field coupler C7 at least until the communication between the electric field coupler C7 and the communication device 10 ends.

Furthermore, in the present embodiment, a different function is assigned to each of the electric field couplers C7 and C8. Specifically, the reception function is assigned to the electric field coupler C7 and the transmission function is assigned to the electric field coupler C8. Thus, when an approach between the communication device 10 and the electric field coupler C7 is detected by the detecting unit 220, the controlling unit 230 causes the signal processing unit 210 to perform a processing of being the reception side of the data assumed to be transmitted from the communication device 10. Since the processing of being the data reception side includes decoding of a reception signal and transmission of ACK, the controlling unit 230 controls the selector 250 and appropriately switches the connection between the electric field coupler C7 and the transmission processing unit 212 or the reception processing unit 214.

Then, when the electric field communication between the communication device 10 and the electric field coupler C7 ends, the controlling unit 230 causes the selectors 250 and 260 to periodically switch the connection destination again.

Similarly, when an approach between the electric field coupler C8 and the communication device 10 is detected by the detecting unit 220, the controlling unit 230 maintains the connection between the signal processing unit 210 and the electric field coupler C8 at least until the communication between the electric field coupler C8 and the communication device 10 ends.

Further, when the approach between the communication device 10 and the electric field coupler C8 is detected by the detecting unit 220, the controlling unit 230 causes the signal processing unit 210 to perform a processing of being the data transmission side to the communication device 10. For example, the controlling unit 230 supplies the data to be transmitted to the communication device 10 from the memory 240 to the transmission processing unit 212, and the transmission processing unit 212 generates a transmission signal. Then, the transmission signal is transmitted from the electric field coupler C8 to the communication device 10. Since the processing of being the data transmission side includes a processing of receiving ACK transmitted from the communication device 10, the controlling unit 230 controls the selector 250 and appropriately switches the connection between the electric field coupler C8 and the transmission processing unit 212 or the reception processing unit 214.

Then, when the electric field communication between the communication device 10 and the electric field coupler C7 ends, the controlling unit 230 causes the selectors 250 and 260 to periodically switch the connection destination again.

As described above, the communication device 10 according to the present embodiment includes the plurality of electric field couplers C7 and C8, and the controlling unit 230 periodically switches the electric field coupler C to be connected to the signal processing unit 210. Thus, the detecting unit 220 detects which of the electric field coupler C7 or C8 the portable device 20 has approached based on the timing at which the reception signal is input into the signal processing unit 210, and the controlling unit 330 causes the signal processing unit 310 to perform the signal processing corresponding to the detected electric field coupler C.

In other words, in the communication device 10 according to the present embodiment, which of the transmission processing or the reception processing the communication device 10 performs can be instructed by which of the electric field couplers C7 and C8 approaches the communication device 10. Thus, as compared with the case where the user is forced to operate buttons, improvement in user convenience can be remarkably attained.

Figure 9:
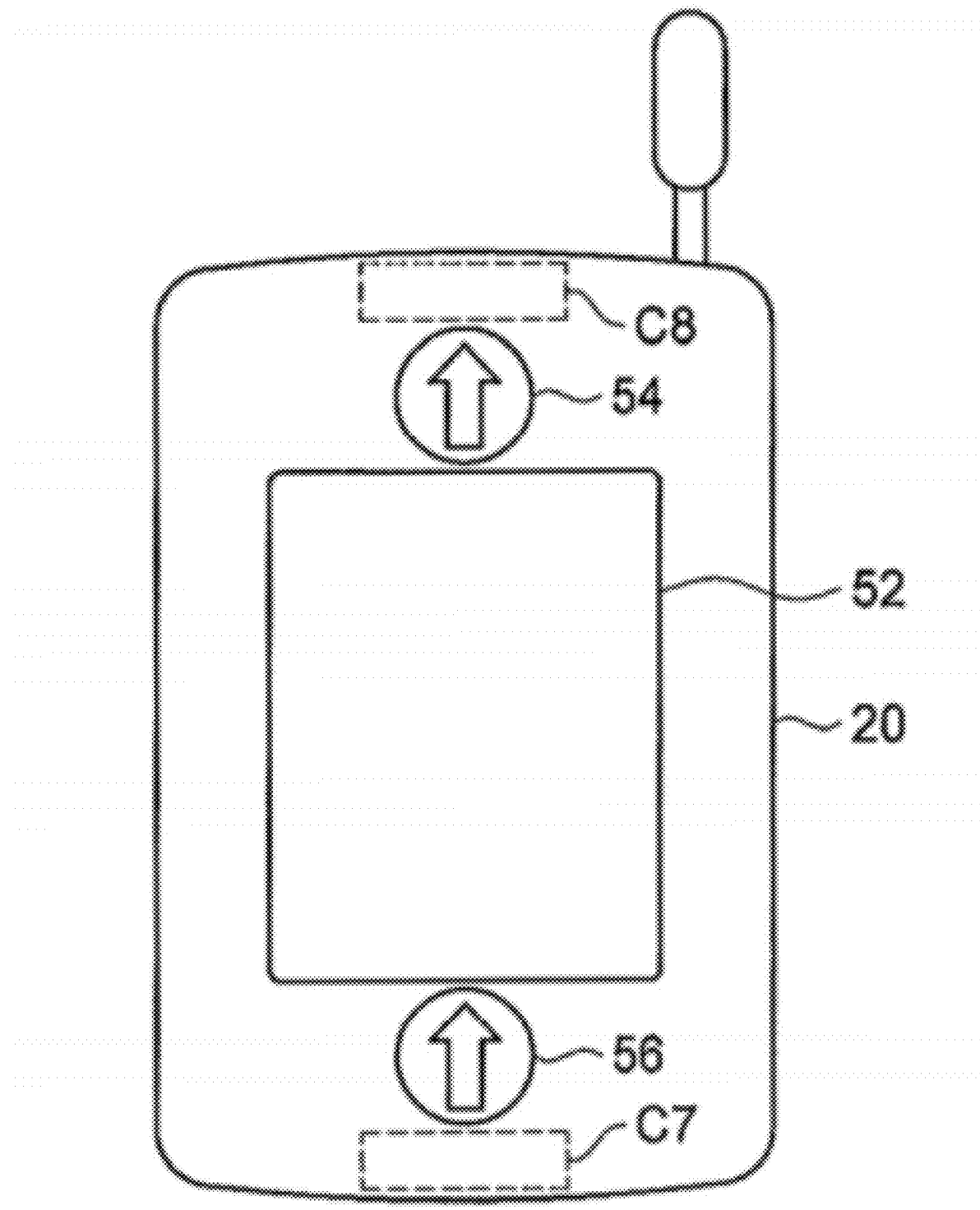
FIG. 9 is an explanatory diagram showing an appearance of the portable device.

The portable device 20 may be configured to notify which communication function is assigned to each of the electric field couplers C7 and C8 as shown in FIG. 9.

FIG. 9 is an explanatory diagram showing an appearance of the portable device 20. As shown in FIG. 9, the portable device 20 includes a main display 52, a sub display 54 and a sub display 56. The main display 52 is a display by which the user of the portable device 20 searches for information from the portable device 20 and into which various items of information are input. On the other hand, the sub display 54 and the sub display 56 have a function as a displaying unit for displaying a function assigned to each of the electric field couplers C7 and C8.

For more detailed description, the electric field coupler C8 to which the transmission function is assigned is arranged inside the sub display 54 and the electric field coupler C7 to which the reception function is assigned is arranged inside the sub display 56. The sub display 54 can cause the user to grasp that the transmission function is performed by making the sub display 54 in the portable device 20 and the communication party approach by indicating an arrow directed outward the portable device 20. On the other hand, the sub display 56 can cause the user to grasp that the reception function is performed by making the sub display 56 in the portable device 20 and the communication party approach by indicating an arrow directed inward the portable device 20.

In this manner, the user can set which function is assigned to each electric field coupler C. Then, icons, characters, colors and signs representing the functions set by the electric field couplers C7 and C8 may be displayed on the sub display 54 and the sub display 56 by the user.

[5] Supplement

It should be understood by those skilled in the art that various modifications, combinations, sub-combinations and alterations may occur depending on design requirements and other factors insofar as they are within the scope of the appended claims or the equivalents thereof.

For example, in the above embodiment, there has been described the case in which the content server 30 functions as a responder and the portable device 20 functions as an initiator, but the present invention is not limited to the example. For example, the content server 30 may function as an initiator, and the portable device 20 may function as a responder. Further, some of the plurality of electric field couplers C provided in the content server 30 may function as an initiator and other ones may function as a responder.

Furthermore, there has been described the example in which the transmission function or the reception function is assigned to the electric field couplers C7 and C8 in the portable device 20 as a different communication function, but the present invention is not limited to the example. For example, temporarily, the transmission function of the content data group may be assigned to the electric field coupler C7 and the transmission function of part of the content data group is assigned to the electric field coupler C8 based on the user operation.

As a specific example, the transmission function of all the music content data stored in the memory 240 is assigned to the electric field coupler C7, and the transmission function of music content data displayed on the main display 52 may foe assigned to the electric field coupler C8. Further, the transmission function of all the music content data stored in the memory 240 may be assigned to the electric field coupler C7, and the transmission function of music content data not stored in the communication party may be assigned to the electric field coupler C8. Furthermore, the transmission function of content data acquired after the predetermined date may be assigned to the electric field coupler C7, and the transmission function of content data acquired before the predetermined date may be assigned, to the electric field coupler C8.

Each step in the processing of the communication system in the present specification does not necessarily need to be processed in time line in the order described in the sequence diagram. For example, each step in the processing of the communication system may include a processing performed in parallel or individually (such as parallel processing or object processing).

Further, there can be created a computer program for causing hardware such as CPU, ROM and RAM incorporated in the communication device 10, the portable device 20 and the content server 30 to exhibit similar function as each structure of the communication device 10, the portable device 20 and the content server 30 described above. A storing medium in which the computer program is stored is also provided. The respective functional blocks illustrated in the functional block diagrams of FIGS. 4 and 7 are configured in hardware, thereby realizing a series of processings in hardware.

The present application contains subject matter related to that disclosed in Japanese Priority Patent Application JP 2008-108137 filed in the Japan Patent Office on Apr. 17, 2008, the entire content of which is hereby incorporated by reference.

What is claimed is:

1. A communication apparatus comprising:
a plurality of communication units for making communication through electric field coupling or magnetic field coupling;
a detecting unit for detecting an approach between a communication party capable of communication through electric field coupling or magnetic field coupling and any one of the plurality of communication units; and
a controlling unit for causing a communication unit whose approach to the communication party is detected by the detecting unit to serve a function of communication assigned to the communication unit, different functions of communication being assigned to each of the plurality of communication units.

2. The communication apparatus according to claim 1, comprising:
a signal processing unit for decoding a reception signal; and
a connecting unit for connecting any one of the plurality of communication units to the signal processing unit,
wherein the controlling unit causes the connecting unit to sequentially switch a communication unit to be connected to the signal processing unit, and
the detecting unit detects a communication unit connected to the signal processing unit via the connecting unit when the reception signal is input into the signal processing unit.

3. The communication apparatus according to claim 2, wherein a communication related to different content data is assigned to each of the plurality of communication units, and the controlling unit causes the signal processing unit to generate a transmission signal related to content data assigned to a communication unit whose approach to the communication party is detected by the detecting unit.

4. The communication apparatus according to claim 2, wherein a data transmission processing or data reception processing is assigned to each of the plurality of communication units, and the controlling unit causes the signal processing unit to perform a processing assigned to a communication unit whose approach to the communication party is detected by the detecting unit.

5. The communication apparatus according to claim 2, wherein a communication related to a predetermined content data group or a communication related to part of the predetermined content data group is assigned to each of the plurality of communication units, and the controlling unit causes the signal processing unit to generate a transmission signal related to the predetermined content data group or part of the predetermined content data group which is assigned to a communication unit whose approach to the communication party is detected by the detecting unit.

6. The communication apparatus according to any one of claims 1 to 5, further comprising a displaying unit for displaying a function of communication assigned to each of the plurality of communication units.

7. A communication method comprising:

detecting an approach between any one of a plurality of communication units for making communication through electric field coupling or magnetic field coupling and a communication party capable of communication through electric field coupling or magnetic field coupling; and causing a communication unit whose approach to the communication party is detected by a detecting unit to serve a function of communication assigned to the communication unit, different functions of communication being assigned to each of the plurality of communication units.

8. A non-transitory computer-readable medium comprising a program configured to cause a computer to function as:

a detecting unit for detecting an approach between any one of a plurality of communication units for making communication through electric field coupling or magnetic field coupling and a communication party capable of communication through electric field coupling or magnetic field coupling; and a controlling unit for causing a communication unit whose approach to the communication party is detected by the detecting unit to serve a function of communication assigned to the communication unit, different functions of communication being assigned to each of the plurality of communication units.

9. A communication system comprising:

a first communication apparatus having a first communication unit for making communication through electric field coupling or magnetic field coupling; and a second communication apparatus including:

a plurality of second communication units for making communication through electric field coupling or magnetic field coupling;

a detecting unit for detecting an approach between the first communication unit and any one of the plurality of second communication units; and a controlling unit for causing a second communication unit whose approach to the first communication unit is detected by the detecting unit to serve a function of communication assigned to the second communication unit, different functions of communication being assigned to each of the plurality of second communication units.

* * * * *